Patented Dec. 4, 1945

2,390,378

UNITED STATES PATENT OFFICE 2,390,378

METHOD OF MAKING SILICONE RESINS

James Marsden, Schenectady, N. Y., assignor to General Electric Company, a corporation of New York No Drawing. Application August 21, 1942, Serial No. 455,616

6 Claims. (Cl. 260—2)

This invention relates to a method of making organo-silicone resins. It is particularly concerned with an improved method of hydrolyzing organo-silicon halides, specifically methyl silicon halides, including mixtures thereof with silicon tetrachlorides, to form soluble, heat-hardenable, organo-silicone resins.

It is well known that organo-silicon halides, including mixtures thereof with silicon tetrahalides, readily hydrolyze and condense to form complex silicones when mixed with water. However, when the hydrolyzable silicon compounds contain a sufficient number of hydrolyzable atoms, i. e., chlorine or bromine atoms, attached directly to the silicon to form heat-hardenable hydrolysis products, hydrolysis thereof by this method ordinarily results in the immediate formation of insoluble gels which can not be used in the manufacture of useful liquid coating compositions. For example, when a mixture of dimethyldichlorosilane, methyltrichlorosilane, and silicon tetrachloride is added to water, an insoluble polymer belonging to a class of polymers known as methyl silicones is formed. These polymers may be described as organo-silicon compounds made up of

units. During hydrolysis the following initial reactions are believed to occur:

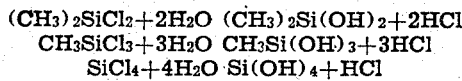

The insoluble gel results from the immediate intercondensation of the hydroxy compounds to form a three-dimensional network.

Useful heat-hardenable liquid silicone resins have been made from some mixtures of organo-silicon halides which normally gel when added directly to water, by slowly pouring dilute ether solutions of the organo-silicon halide compositions onto cracked ice or into a mixture of ice and water. However, when organo-silicon halides are hydrolyzed by this method it is necessary to use large quantities of an expensive and highly inflammable solvent and to carry out the entire hydrolysis reaction at low temperatures preferably in the neighborhood of 0° C.

The present invention is based on my discovery that heat-hardenable liquid silicone resins may be more economically and safely produced by employing certain ketones as solvents for the hydrolyzable organo-silicon halides. The specific class of ketones found to be useful for carrying out my invention are the unsymmetrical ketones having one methyl group attached to the carbonyl group, e. g. methyl ethyl ketone, methyl propyl ketone, methyl isopropylketone, methyl isobutyl ketone, methyl amyl ketone, etc. Besides being much less inflammable than ether, these ketones offer a number of advantages when used as solvents for the hydrolyzable organo-silicon halides. I have found that the use of ketones permits the hydrolysis of relatively concentrated solutions of the silicon halides to form liquid silicones free or substantially free from gel. Thus a substantial saving in the cost of the solvent necessary to hydrolyze a given amount of silicon halide is realized. In addition, hydrolysis of the ketone solutions in general may satisfactorily be carried out at any temperature below 30° C. without using ice or a mixture of ice and water as the hydrolyzing medium. No ice is formed during hydrolysis since the reactions are exothermic.

In order that those skilled in the art better may understand how the present invention may be carried into effect the following illustrative examples thereof are given.

*Example 1.*—Twenty-nine grams of a mixture of methyl silicon halides consisting of 45 per cent by weight of methyldichlorosilane and 55 per cent by weight of methyltrichlorosilane and having an average methyl-to-silicon ratio of about 1.5 was dissolved in 20 grams methyl propyl ketone and the resultant solution slowly added to 100 grams water. The water was continuously stirred during the addition of the chlorosilane mixture. Two layers formed. The lower layer which consisted of a water solution of most of the methyl propyl ketone and the hydrogen chloride formed during the hydrolysis reaction, was separated from the upper layer which consisted essentially of a solution of the liquid, soluble methyl silicones in a small amount of the methyl propyl ketone.

*Example 2.*—A solution of 400 grams of a mixture of chlorosilanes consisting of 59.4 mol-per cent methyl dichlorosilane, 22.8 mol-per cent methyltrichlorosilane, and 17.8 mol-per cent silicon tetrachloride in 460 grams of methyl isobutyl ketone was dropped slowly into 1150 grams of water. This mixture of chlorosilanes contained an average of about 2.6 chlorine atoms per silicon. The temperature of the reaction mass was kept below 30° C. by means of tap water circulating through a cooling coil immersed in the reaction mass. The water was continuously stirred while the chloride solution was being added. On completion of hydrolysis, stirring was stopped and separation of two liquids occurred. The upper layer consisted essentially of methyl silicone dissolved in methyl isobutyl ketone and the lower layer of hydrochloric acid.

*Example 3.*—Example 2 was repeated using methyl ethyl ketone instead of methyl isobutyl ketone. Since methyl ethyl ketone is very soluble in the hydrochloric acid formed during hydrolysis of the silicon chlorides, the soluble, heat-hardenable resinous products which collected, in this case, in the lower layer, were substantially free of methyl ethyl ketone.

The composition of each of the layers formed after hydrolysis of the ketone solutions depends on the type of ketone used. With the methyl ethyl ketone and the methyl propyl ketone, both of which are water soluble, most of the solvent is recovered from the water layer. The higher ketones which are not so soluble in water or hydrochloric acid remain in the upper methyl silicone layer and may be either removed therefrom by evaporation or used as all or part of the solvent in the preparation of coating and impregnating varnishes.

The heat-hardenable liquid silicones of the invention can be used in any of the numerous applications for which such resins are adapted. The resins are particularly useful as coatings and impregnants for glass fiber tapes, asbestos sheet and the like to form high temperature insulating materials.

Although I have described the practice of my invention with specific reference to the hydrolysis of methyl silicon halides including mixtures thereof with silicon tetrachloride it is to be understood that the invention is equally applicable to the hydrolysis of other organo-silicon halides or halide mixtures, such for example as the ethyl silicon halides, phenyl silicon halides, mixtures of such silicon halides with each other or with methyl silicon halides, etc.

What I claim as new and desire to secure by Letters Patent of the United States, is:

1. In the method of hydrolyzing a mixture of silicon halides including methyl silicon halides and containing a sufficient number of halogen atoms attached directly to silicon to form insoluble gels when mixed directly with water, the steps which comprise dissolving said silicon halide mixture in an unsymmetrical ketone selected from the class consisting of methyl ethyl, methyl propyl, methyl isopropyl, methyl isobutyl, and methyl amyl ketones and slowly adding the resultant solution to a hydrolysis medium consisting of liquid water under conditions such that the temperature of the medium is maintained below 30° C. and no ice is formed during the hydrolysis.

2. The method of hydrolyzing a mixture of methyl silicon halides containing a sufficient number of halogen atoms attached directly to silicon to form insoluble gels when mixed directly with water, the steps which comprise forming a solution of said methyl silicon halide mixture in methyl propyl ketone and hydrolyzing the methyl-silicon halides by slowly adding said solution to a hydrolysis medium consisting of liquid water under conditions such that the temperature of the medium is maintained below 30° C. and no ice is formed during the hydrolysis.

3. The method of hydrolyzing a mixture of methyl silicon halides and a silicon tetrahalide containing a sufficient number of halogen atoms attached directly to silicon to form insoluble gels when mixed directly with water which comprises dissolving said mixture in an unsymmetrical ketone selected from the class consisting of methyl ethyl, methyl propyl, methyl isopropyl, methyl isobutyl, and methyl amyl ketones and slowly adding said solution to a hydrolysis medium consisting of liquid water under conditions such that the temperature of the medium is maintained below 30° C. and no ice is formed during the hydrolysis.

4. The method of claim 3 wherein the ketone is methyl isobutyl ketone.

5. The method of hydrolyzing a mixture of dimethyl silicon dichloride, methyl silicon trichloride and silicon tetrahalide containing an average of about 2.6 halogen atoms per silicon atom to form heat-hardenable hydrolysis products which comprises forming a solution of said mixture in an unsymmetrical ketone selected from the class consisting of methyl ethyl, methyl propyl, methyl isopropyl, methyl isobutyl, and methyl amyl ketones and hydrolyzing said mixture by slowly adding said solution to a hydrolysis medium consisting of liquid water under conditions such that the temperature of the medium is maintained below 30° C. and no ice is formed during the hydrolysis.

6. The method of hydrolyzing a mixture of methyl-dichlorosilane and methyltrichlorosilane having an average methyl-to-silicon ratio of about 1.5 which comprises dissolving said mixture in methyl propyl ketone and slowly adding the resultant solution to a hydrolysis medium consisting of liquid water under conditions such that the temperature of the medium is maintained below 30° C. and no ice is formed during the hydrolysis.

JAMES MARSDEN.